US012761474B2

(12) United States Patent
Zhao et al.

(10) Patent No.: US 12,761,474 B2
(45) Date of Patent: Oct. 13, 2026

(54) DISPLAY APPARATUS, ELECTRONIC DEVICE, AND TRANSPORTATION MEANS

(71) Applicant: Yinwang Intelligent Technologies Co., Ltd., Shenzhen (CN)

(72) Inventors: Han Zhao, Dongguan (CN); Lei Mao, Shenzhen (CN); Zhiyong Huang, Shenzhen (CN); Xiao Li, Dongguan (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 209 days.

(21) Appl. No.: 18/633,008

(22) Filed: Apr. 11, 2024

(65) Prior Publication Data

US 2024/0255757 A1 Aug. 1, 2024

Related U.S. Application Data

(63) Continuation of application No. PCT/CN2022/116030, filed on Aug. 31, 2022.

(30) Foreign Application Priority Data

Oct. 14, 2021 (CN) .......................... 202111195784.4

(51) Int. Cl.

*G02B 27/01* (2006.01)
*G02B 5/10* (2006.01)
*G02B 5/30* (2006.01)

(52) U.S. Cl.

CPC ........... *G02B 27/0101* (2013.01); *G02B 5/10* (2013.01); *G02B 5/3083* (2013.01); *G02B 2027/013* (2013.01)

(58) Field of Classification Search

CPC .... G02B 27/0101; G02B 5/10; G02B 5/3083; G02B 2027/013; G02B 5/02; G02B 17/06; G02B 27/286; G02B 27/0983; G02B 27/28; G02B 2027/014; G03B 21/2073; G03B 21/28; G03B 21/604; G03B 21/20; B60R 11/02

See application file for complete search history.

(56) References Cited

U.S. PATENT DOCUMENTS

2019/0033699 A1 1/2019 Iigahama et al.
2020/0348522 A1* 11/2020 Xiao .................. G02B 27/0172
2022/0055479 A1* 2/2022 Qin .................... G02B 27/0101

FOREIGN PATENT DOCUMENTS

CN 205028590 U 2/2016
CN 108227205 A 6/2018
CN 208000411 U 10/2018

(Continued)

*Primary Examiner* — Mariam Qureshi

(74) *Attorney, Agent, or Firm* — Leydig, Voit & Mayer, Ltd.

(57) ABSTRACT

A display apparatus includes a picture generation unit, a transflective member, and a curved mirror. The picture generation unit is configured to generate imaging light including image information and project the imaging light to the transflective member, the transflective member is configured to reflect the imaging light to the curved mirror, the curved mirror is configured to reflect received imaging light to the transflective member, and the transflective member is further configured to transmit the imaging light reflected by the curved mirror.

18 Claims, 11 Drawing Sheets

(56) References Cited

FOREIGN PATENT DOCUMENTS

| | | | |
|---|---|---|---|
| CN | 212586650 | U | 2/2021 |
| CN | 213399047 | U | 6/2021 |
| CN | 114690532 | B | 4/2024 |
| JP | H11237584 | A | 8/1999 |
| JP | 2001177784 | A | 6/2001 |
| JP | 2018502322 | A | 1/2018 |
| JP | 2018081276 | A | 5/2018 |
| KR | 20010060284 | A | 7/2001 |
| KR | 102129669 | B1 | 7/2020 |
| WO | 2020119320 | A1 | 6/2020 |

* cited by examiner

DISPLAY APPARATUS, ELECTRONIC DEVICE, AND TRANSPORTATION MEANS

CROSS-REFERENCE TO RELATED APPLICATIONS

This filing is a continuation of International Application No. PCT/CN2022/116030 filed on Aug. 31, 2022, which claims priority to Chinese Patent Application No. 202111195784.4 filed on Oct. 14, 2021. The disclosures of the aforementioned applications are hereby incorporated by reference in their entireties.

TECHNICAL FIELD

Disclosed embodiments relate to the field of image display, and in particular, to a display apparatus, an electronic device, and a transportation means.

BACKGROUND

Image display technology is developing rapidly, and display size is increasing. However, currently, a large-screen (for example, at least 80 inches) display system is very costly. A laser television may implement a projection effect of at least 100 inches, but a curtain (Fresnel screen) with a specific function is needed to improve viewing experience, and the laser television occupies a large space. In addition, an existing projector usually needs a large projection distance, and cannot generate an enlarged image at a close distance.

SUMMARY

In view of this, embodiments of this disclosure provide a display apparatus, a transportation means, and an electronic device to provide a large-size display function.

According to a first aspect, a display apparatus may include a picture generation unit, a transflective member, and a curved mirror.

The picture generation unit is used to (configured to) generate imaging light including image information and project the imaging light to the transflective member, the transflective member is configured to reflect the imaging light to the curved mirror, the curved mirror is configured to reflect the received imaging light to the transflective member, and the transflective member is further configured to transmit the imaging light reflected by the curved mirror. Therefore, a light ray reflected by the curved mirror may pass through the transflective member and enter a human eye, and the human eye may capture a magnified virtual image via the light ray, thereby meeting a requirement for large-size viewing. Different from a real image display manner, the virtual image does not need to be borne by a specific screen, so that an effect of displaying a large-size image in a small space can be implemented.

In addition, in a solution to this embodiment, the transflective member may not only reflect the imaging light to the curved mirror, but also transmit the imaging light reflected by the curved mirror, that is, the transflective member is located (positioned) along a light path in which the imaging light reflected by the curved mirror is located and may transmit the imaging light reflected by the curved mirror. Therefore, the transflective member may be close to a location of the curved mirror (may be located within a focal length of the curved mirror), thereby effectively folding a light path, and reducing a volume of the display apparatus.

In a possible implementation, the imaging light reflected by the transflective member and imaging light transmitted by the transflective member have different incident angles. The transflective member may implement the foregoing functions by film-coating.

In a possible implementation, the transflective member may transmit imaging light less than a first preset angle and reflect imaging light greater than a second preset angle. For example, the first preset angle is 30 degrees, and the second preset angle is 45 degrees.

In a possible implementation, a polarization direction of the imaging light reflected by the transflective member is different from a polarization direction of the imaging light transmitted by the transflective member.

In a possible implementation, the transflective member includes a polarized transflective member, and a polarization direction of imaging light reflected by the polarized transflective member is perpendicular to a polarization direction of imaging light transmitted by the polarized transflective member. For example, the imaging light reflected by the polarized transflective member is P polarized light, and the imaging light transmitted by the polarized transflective member is S polarized light. Alternatively, the imaging light reflected by the polarized transflective member is S polarized light, and the imaging light transmitted by the polarized transflective member is P polarized light.

In a possible implementation, the transflective member includes the polarized transflective member, where the imaging light reflected by the polarized transflective member is circularly polarized light or elliptically polarized light, and the imaging light transmitted by the polarized transflective member is linearly polarized light.

In a possible implementation, the display apparatus further includes a first polarization conversion device, where the first polarization conversion device is positioned along a light path between the transflective member and the curved mirror and is configured to change a polarization direction of the imaging light reflected by the transflective member and/or a polarization direction of the imaging light reflected by the curved mirror.

In a possible implementation, the display apparatus further includes a diffusion element. The diffusion element is positioned along a light path between the picture generation unit and the transflective member and is configured to diffuse the imaging light projected by the picture generation unit. The diffusion element may play a role of uniforming light, to avoid a case in which a part of a displayed image is excessively bright or excessively dark.

In a possible implementation, the display apparatus further includes a first polarizer located (positioned) on a light-emitting side of the diffusion element, where the first polarizer transmits S polarized light or P polarized light. The first polarizer enables the S polarized light or the P polarized light to be transmitted to the transflective member for transmission or reflection.

In a possible implementation, the transflective member in the display apparatus includes a semi-reflective and semi-transparent film and a second polarizer. The semi-reflective and semi-transparent film reflects a first part of the imaging light to a curved mirror, and transmits a second part of the imaging light to the second polarizer. The second polarizer absorbs the second part of the incident imaging light and transmits the imaging light reflected by the curved mirror.

The second polarizer may be referred to as a polarization absorption film. The semi-reflective and semi-transparent film may be a semi-reflective and semi-transparent wave plate.

In a possible implementation, the imaging light reflected by the semi-reflective and semi-transparent film in the transflective member is P polarized light, the imaging light by absorbed the second polarizer is P polarized light, and the imaging light transmitted by the second polarizer is S polarized light, or the imaging light reflected by the semi-reflective and semi-transparent film is S polarized light, the imaging light absorbed by the second polarizer is S polarized light, and the imaging light transmitted by the second polarizer is P polarized light.

In a possible implementation, the semi-reflective and semi-transparent film is attached to the second polarizer.

The foregoing semi-reflective and semi-transparent film and the second polarizer may entirely implement functions of the foregoing polarized transflective member, that is, reflecting the P polarized light and transmitting the S polarized light, or reflecting the S polarized light and transmitting the P polarized light.

In a possible implementation, the imaging light reflected by the semi-reflective and semi-transparent film in the transflective member is circularly polarized light or elliptically polarized light, and the imaging light transmitted by the semi-reflective and semi-transparent film is circularly polarized light or elliptically polarized light.

In a possible implementation, the transflective member further includes a second polarization conversion device located (positioned) between the semi-reflective and semi-transparent film and the second polarizer, where the second polarization conversion device is configured to change a polarization direction of the circularly polarized light or the elliptically polarized light transmitted by the semi-reflective and semi-transparent member and/or a polarization direction of circularly polarized light or elliptically polarized light reflected by the curved mirror.

In a possible implementation, the semi-reflective and semi-transparent film and the second polarizer are attached to the second polarization conversion device.

In a possible implementation, the display apparatus further includes a third polarization conversion device located (positioned) along a light-emitting side of the first polarizer, where the third polarization conversion device is configured to change a polarization direction of polarized light transmitted by the first polarizer.

In a possible implementation, the imaging light projected by the picture generation unit is linearly polarized light, circularly polarized light, or elliptically polarized light.

In a possible implementation, the first polarization conversion device in the display apparatus is further positioned along a light path between the polarized transflective member and the picture generation unit and is configured to change a polarization direction of the imaging light from the picture generation unit.

In this case, the first polarizer may be disposed in parallel with the polarized transflective member or be attached together to the polarized transflective member so that a structure is entirely more compact.

In another implementation, the first polarization conversion device may be positioned along a light path between the polarized transflective member and the diffusion element, the polarizer, and the third polarization conversion device, that is, the imaging light emitted by the picture generation unit may sequentially pass through the diffusion element, the polarizer, and the third polarization conversion device to reach the first polarization conversion device, and the first polarization conversion device transmits imaging light to the polarized transflective member.

In a possible implementation, the curved mirror is a multi-focus curved mirror or a free-form curved mirror.

In a possible implementation, the picture generation unit in the display apparatus includes a light source, an imaging module, and a projection lens. The light source is configured to output a light beam to the imaging module, the imaging module is configured to generate, based on the light beam, imaging light including image information, and the projection lens is configured to project the imaging light to the transflective member.

In a possible implementation, the transflective member is positioned within the focal length of the curved mirror. In this way, an image reflected by the transflective member may be magnified and displayed by the curved mirror.

In the foregoing implementation, the first polarization conversion device, the second polarization conversion device, and the third polarization conversion device may be a quarter-wave plate, two eighth-wave plates, or a rotator.

According to a second aspect, this application provides an electronic device, where the electronic device includes the display apparatus in the first aspect.

According to a third aspect, this disclosure further provides a transportation means, and the transportation means includes the display apparatus in the first aspect.

In a possible implementation, the display apparatus is installed on a seat of the transportation means.

DESCRIPTION OF EMBODIMENTS

Figure 1A:
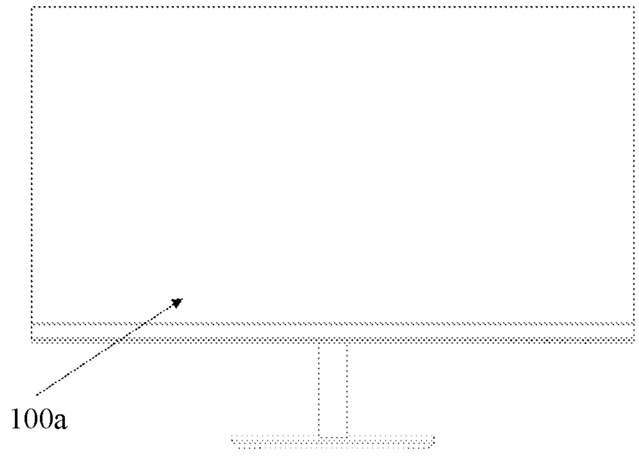
FIG. 1*a* is a schematic diagram of a display apparatus used as a common display according to an embodiment of this disclosure.
Figure 1B:
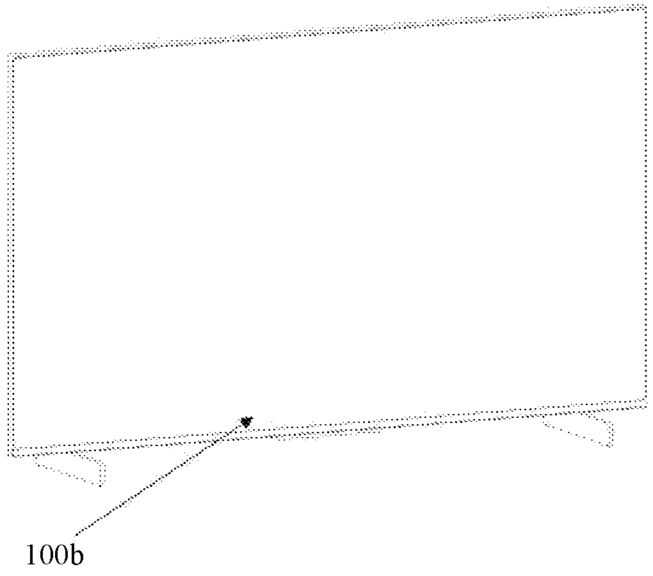
FIG. 1*b* is a schematic diagram of a display apparatus used as a television according to an embodiment of this disclosure.
Figure 1C:
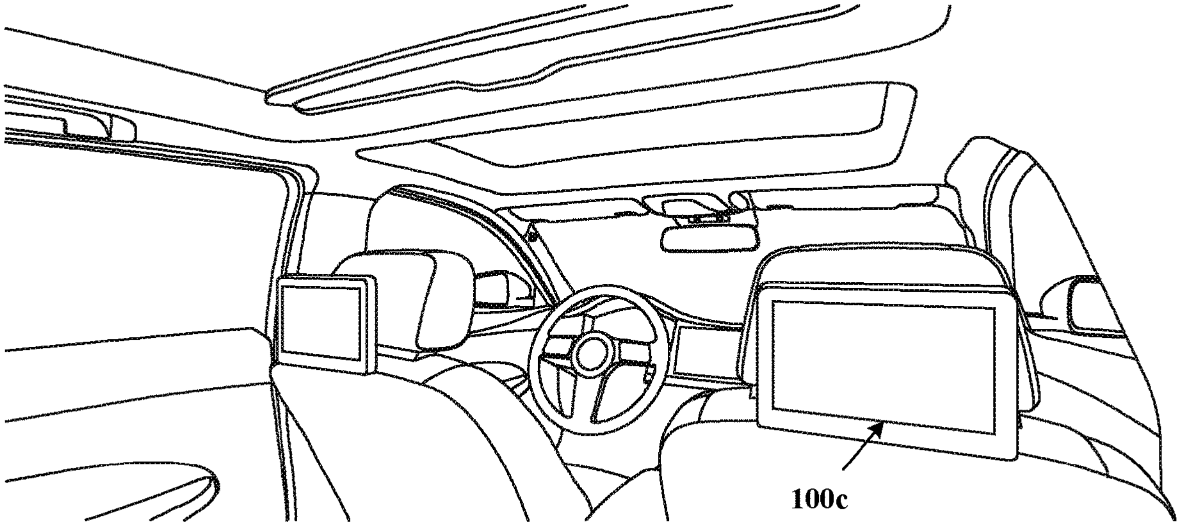
FIG. 1*c* is a schematic diagram of a display apparatus used as a vehicle-mounted display according to an embodiment of this disclosure.

This disclosure provides a display apparatus, an electronic device, and a transportation means. The display apparatus may be used as a common display (for example, 100*a* shown in FIG. 1*a*) for office use, or may be used as a television (for example, 100*b* shown in FIG. 1*b*) for home entertainment (as a television), or may be used for vehicle-mounted display (for example, 100*c* shown in FIG. 1*c*, where the display apparatus is installed on a seat of a vehicle). A physical size, a display size, and a resolution of the display apparatus may be adjusted based on a use scenario.

In this disclosure, the display apparatus may also be referred to as a display system or a virtual image display apparatus. A unit or module included in the display apparatus may be referred to as a component or mechanism.

Figure 2:
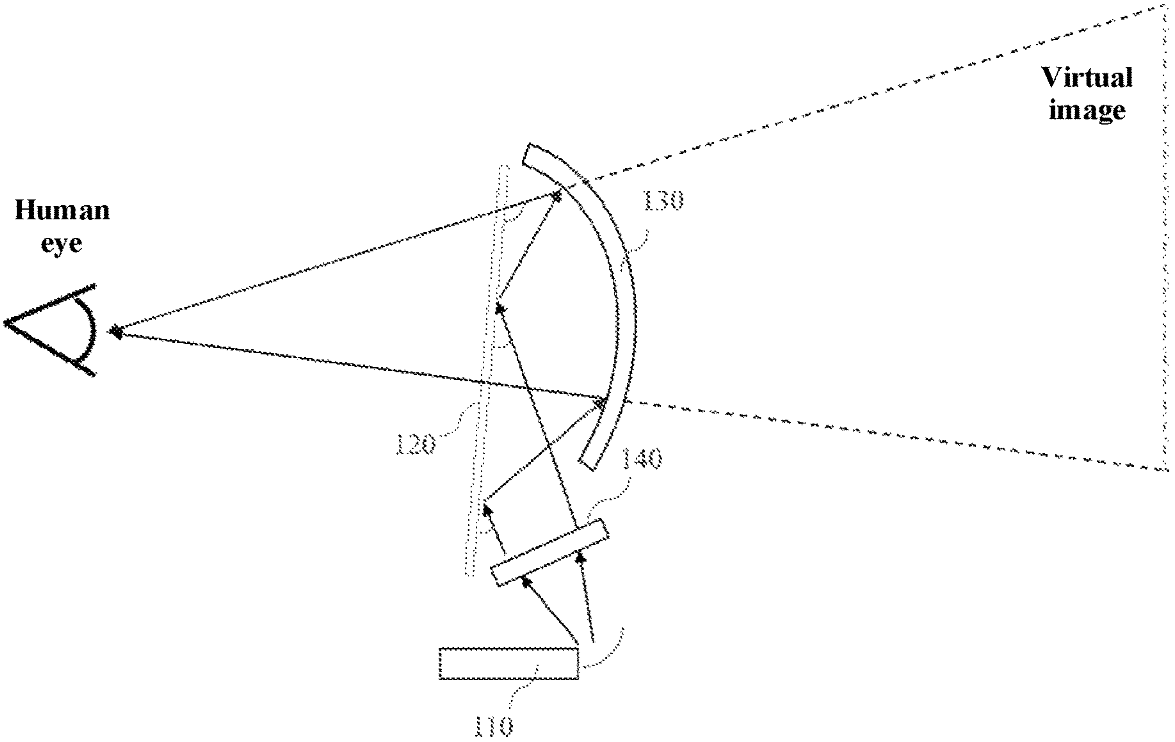
FIG. 2 is a schematic diagram of a structure of a display apparatus according to an embodiment of this disclosure.

FIG. 2 is a schematic diagram of a structure of a display apparatus according to an embodiment of this disclosure.

As shown in FIG. 2, the display apparatus includes a picture generation unit (PGU) 110, a transflective member 120, and a curved mirror 130. The picture generation unit 110 is configured to generate imaging light including image information and project the imaging light to the transflective member 120; the transflective member (which may be referred to as a transflective element or a transflective component) 120 is configured to reflect the imaging light to a concave surface of the curved mirror 130; and the curved mirror 130 is configured to reflect the received imaging light to the transflective member 120, where the transflective member 120 is further configured to transmit the imaging light reflected by the curved mirror 130.

In the display apparatus provided in this embodiment, the concave surface of the curved mirror 130 is used as a reflective surface, and the concave surface is configured to magnify an image reflected by the transflective member 120 (for example, the transflective member 120 is located within a focal length of the curved mirror 130). Therefore, the display apparatus may minify and magnify an image generated by the picture generation unit 110. Eye of a user may receive a light ray reflected by the curved mirror 130, so that a magnified virtual image (a reverse extension cord of actual light) is observed. Compared with a projector or a large-size television in current technologies, the display apparatus provided in this embodiment may display a virtual image. Therefore, a large-size image may be displayed without a specific screen or occupying a large space.

As shown in FIG. 2, the display apparatus provided in this embodiment may include a diffusion element (which may be a diffusion screen or a diffusion plate) 140, where the diffusion element 140 is located on a light path between the picture generation unit 110 and the transflective member 120, and is configured to diffuse the imaging light projected by the picture generation unit 110, to enable brightness uniformity of a displayed image. For example, the imaging light projected by the picture generation unit 110 is diffusely reflected or uniformly transmitted through the diffusion plate.

In the display apparatus provided in this embodiment of this disclosure, the transflective member 120 may be a film-coated reflector or a polarized transflective member. The film-coated reflector may reflect light of which an incident angle is less than a first threshold and transmit light of which an incident angle is greater than a second threshold. By adjusting locations of the curved mirror 130 and the diffusion element 140, imaging light transmitted by the diffusion element can be reflected by the transflective member 120, and light ray reflected by the curved mirror 130 may be transmitted to a human eye by the transflective member 120. The first threshold may be 40 degrees, and the second threshold may be 50 degrees.

Figure 3:
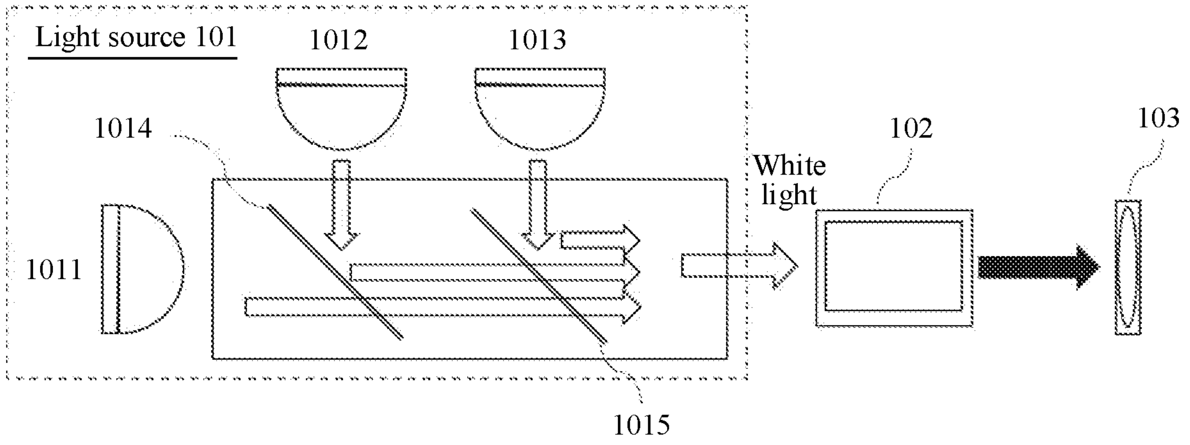
FIG. 3 is a schematic diagram of a structure of a picture generation unit in a display apparatus according to an embodiment of this disclosure.

FIG. 3 is a schematic diagram of a structure of a picture generation unit in a display apparatus according to an embodiment of this disclosure.

As shown in FIG. 3, the picture generation unit includes a light source 101, an imaging module 102, and a projection lens 103, and the picture generation unit may be used in the foregoing display apparatus or may be used independently.

In this embodiment, the light source 101 outputs a light beam (white light) to the imaging module 102. The imaging module 102 may use a light beam 1 to generate a source image. The projection lens 103 is configured to project imaging light outwards, and the projection lens may be a short-focus lens.

In this embodiment, the imaging module 102 may be a liquid crystal on silicon (LCOS) display, an organic light-emitting diode (OLED) display, a liquid crystal display (LCD), a digital light processing (DLP) display, or a micro-electro-mechanical system (MEMS) display.

In this embodiment, the light source 101 may include a three-color light source (a blue light source 1011, a green light source 1012, and a red light source 1013), and white light outputted after mixing of monochromatic light emitted by the three-color light source (which may be referred to as a tricolor light source) is inputted to the imaging module 102, to generate the source image. The light source 101 may further include a first wave plate 1014 and a second wave plate (a semi-reflective and semi-transparent wave plate) 1015. The blue light source 1011, the green light source 1012, and the red light source 1013 may be light-emitting diode (Light-Emitting Diode, LED) light sources, or may be laser diode light sources.

The first wave plate 1014 is located on light paths of light rays (light) outputted by the light sources 1011 and 1012 and is configured to transmit and reflect light. For example, the first wave plate 1014 transmits blue light emitted by the light source 1011, and reflects green light emitted by the light source 1012. After mixing the transmitted light, the reflected light is inputted to the second wave plate 1015.

The second wave plate 1015 is also located on a light path of three-color light outputted by the three-color light source (1011, 1012, 1013), and is configured to transmit and reflect the three-color light. For example, the second wave plate 1015 transmits the blue light emitted by the light source 1011, transmits the green light emitted by the light source 1012, and reflects and transmits red light emitted by the light source 1013. After the reflected red light and two ways of transmitted light (the green light and the blue light) are mixed, the mixed light is inputted to the imaging module 102.

Figure 4:
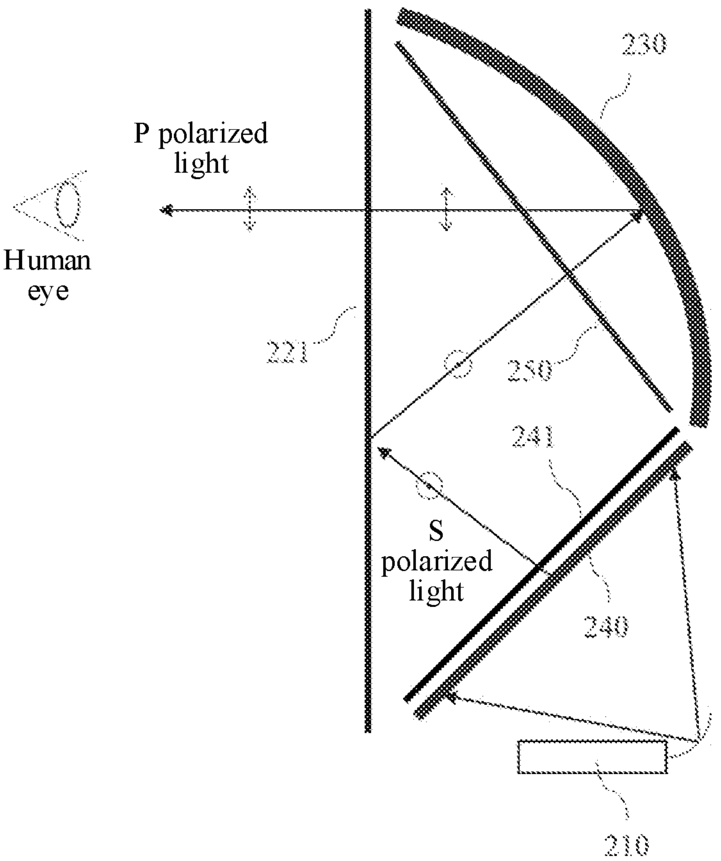
FIG. 4 is a schematic diagram of a structure of a display apparatus according to an embodiment of this disclosure.

FIG. 4 is a schematic diagram of a structure of a display apparatus according to an embodiment of this disclosure.

As shown in FIG. 4, the display apparatus includes a picture generation unit 210, a transflective member (a polarizer 221 that transmits P polarized light and reflects S polarized light in this embodiment), a curved mirror 230, a diffusion element 240, a first polarization conversion device (a quarter-wave plate 250 in this embodiment), and a first polarizer (an S polarizer 241 in this embodiment). Functions of the picture generation unit 210, the curved mirror 230, and the diffusion element 240 are respectively the same as those of the picture generation unit 110, the curved mirror 130, and the diffusion element 140 in the foregoing embodiment, and details are not described herein again.

The polarizer 221 that transmits P polarized light and reflects S polarized light may reflect S polarized light and transmit P polarized light, and a polarization direction of the S polarized light is perpendicular to a polarization direction of the P polarized light.

The quarter-wave plate 250 is located on a light path between the polarizer 221 that transmits P polarized light and reflects S polarized light and the curved mirror 230 and is configured to change a polarization direction of imaging light reflected by the polarizer 221 that transmits P polarized light and reflects S polarized light and a polarization direction of imaging light reflected by the curved mirror 230. The quarter-wave plate 250 is located on a light-emitting side of the curved mirror 230 and covers the curved mirror 230.

The S polarizer 241 is located on a light-emitting side of the diffusion element 240, and the S polarizer transmits S polarized light.

In the display apparatus provided in this embodiment, after imaging light transmitted by the diffusion element 240 is filtered by the S polarizer 241, S polarized light (a polarization direction of which shown in the figure is perpendicular to paper) in the imaging light is filtered out, so that the S polarized light is transmitted to the polarizer 221 that transmits P polarized light and reflects S polarized light. The polarizer 221 that transmits P polarized light and reflects S polarized light reflects the S polarized light to the quarter-wave plate 250, and the quarter-wave plate 250 performs a first phase delay on the incident S polarized light, so that the S polarized light is changed to circularly polarized light or elliptically polarized light. The curved mirror 230 reflects the polarized light that is after the first phase delay, that is, reflected polarized light enters the quarter-wave plate 250 again, the quarter-wave plate 250 performs a second phase delay on the polarized light reflected by the curved mirror 230, and the circularly polarized light or the elliptically polarized light is changed to P polarized light. After the foregoing two phase delays of the quarter-wave plate 250, the incident S polarized light is changed to the emitted P polarized light (a polarization direction of which shown in the figure is parallel with the paper), the P polarized light may be transmitted from the polarizer 221 that transmits P polarized light and reflects S polarized light to a human eye, and the human eye may capture an amplified virtual image.

In the display apparatus provided in this embodiment, a polarizer may be located in the picture generation unit 210 (for example, located on a light-emitting side of a projection lens of the picture generation unit 210). In this case, the picture generation unit 210 directly projects S polarized light to the diffusion element 240, and a polarizer on the light-emitting side of the diffusion element 240 is not needed.

In this embodiment, the quarter-wave plate 250 may cover the entire curved mirror 230, so that both light reflected by the polarizer 221 that transmits P polarized light and reflects S polarized light and light reflected by the curved mirror 230 pass through the quarter-wave plate, so that light utilization is improved.

Figure 5:
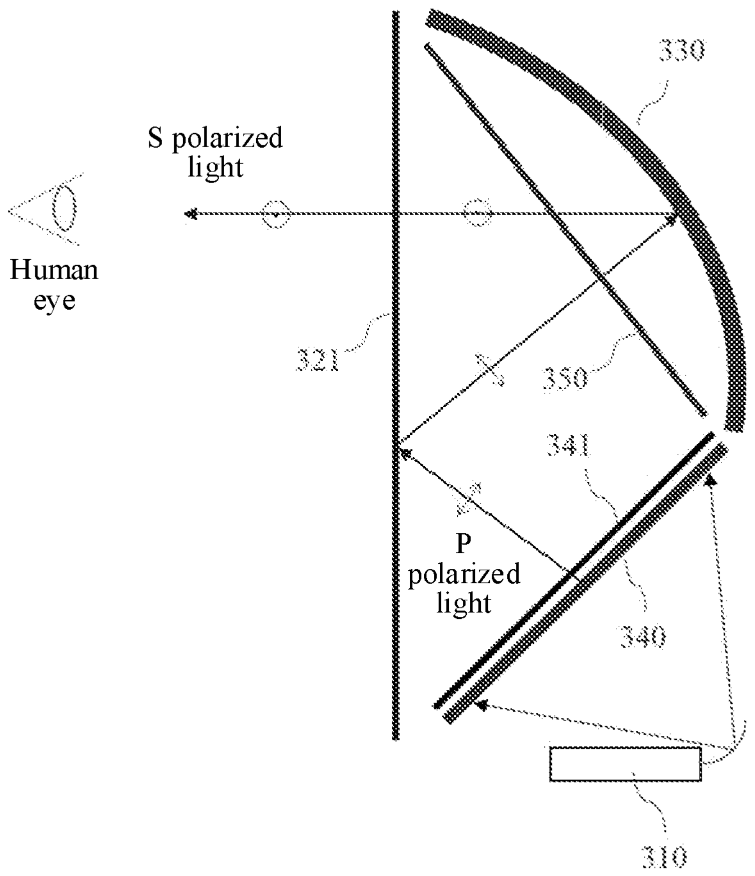
FIG. 5 is a schematic diagram of a structure of a display apparatus according to an embodiment of this disclosure.

FIG. 5 is a schematic diagram of a structure of a display apparatus according to an embodiment of this disclosure.

A display principle of the display apparatus provided in FIG. 5 is the same as that of the display apparatus in FIG. 4, and a difference lies in that a transflective member is a polarizer 321 that transmits S polarized light and reflects P polarized light in this embodiment, and a first polarizer is a P polarizer 341 in this embodiment. Functions of picture generation unit 310, curved mirror 330, and diffusion element 340 are respectively the same as those of the picture generation unit 210, the curved mirror 230, and the diffusion element 240 in the foregoing embodiment, and details are not described herein again.

The polarizer 321 that transmits S polarized light and reflects P polarized light may reflect P polarized light and transmit S polarized light. The P polarizer 341 is located on a light-emitting side of the diffusion element 340, and the P polarizer transmits P polarized light. The P polarizer may alternatively be a polarizer that transmits P polarized light.

In the display apparatus provided in this embodiment, after imaging light transmitted by the diffusion element 240 is filtered by the P polarizer 341, the P polarized light (a polarization direction of which shown in the figure is parallel with paper) in the imaging light is filtered out, so that the P polarized light is transmitted to the polarizer 321 that transmits S polarized light and reflects P polarized light. The polarizer 321 that transmits S polarized light and reflects P polarized light reflects the P polarized light to a quarter-wave plate 350, and the quarter-wave plate 350 performs a first phase delay on the incident P polarized light, so that the P polarized light is changed to circularly polarized light or elliptically polarized light. The curved mirror 330 reflects the polarized light that is after the first phase delay, that is, reflected polarized light enters the quarter-wave plate 350 again, the quarter-wave plate 350 performs a second phase delay on the polarized light reflected by the curved mirror 330, and the circularly polarized light or the elliptically polarized light is changed to S polarized light. After the foregoing two phase delays of the quarter-wave plate 350, the incident P polarized light is changed to the emitted S polarized light, the S polarized light may be transmitted by the polarizer 321 that transmits S polarized light and reflects P polarized light to a human eye, and the human eye may capture an amplified virtual image.

Figure 6:
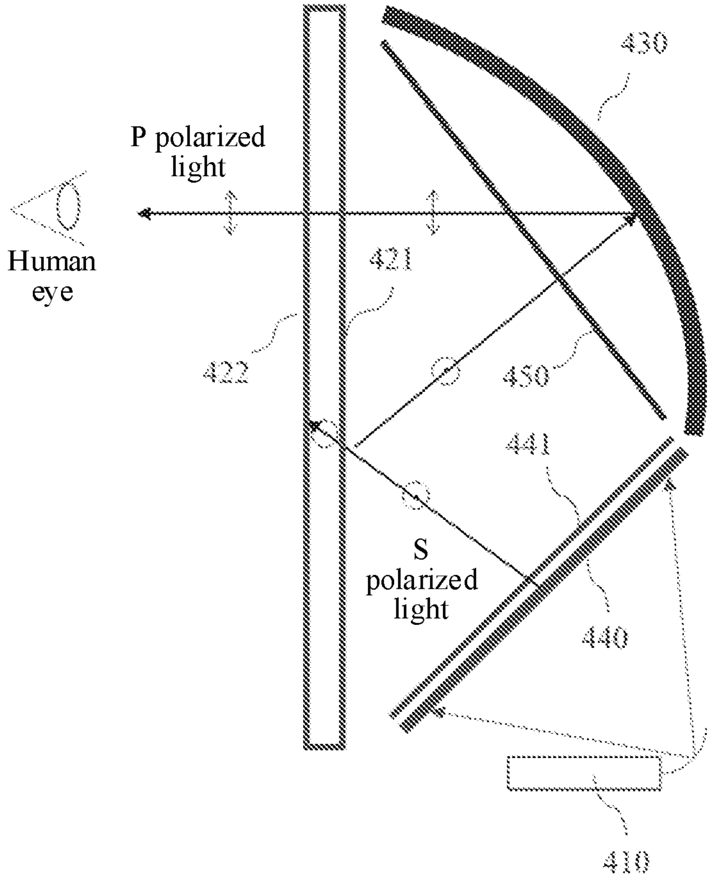
FIG. 6 is a schematic diagram of a structure of a display apparatus according to an embodiment of this disclosure.

FIG. 6 is a schematic diagram of a structure of a display apparatus according to an embodiment of this disclosure.

The display apparatus shown in FIG. 6 is similar to the display apparatus shown in FIG. 4, and a difference lies in that transflective members in an embodiment shown in FIG. 6 include a semi-reflective and semi-transparent film 421 and a second polarizer (a P polarizer 422), and a transflective member in the embodiment shown in FIG. 4 is the polarizer 221 that transmits P polarized light and reflects S polarized light. Functions of picture generation unit 410, curved mirror 430, and diffusion element 440 are respectively the same as those of the picture generation unit 210, the curved mirror 230, and the diffusion element 240 in the foregoing embodiment, and details are not described herein again.

The P polarizer 422 may transmit P polarized light but cannot transmit S polarized light (where the S polarized light is absorbed). The semi-reflective and semi-transparent film 421 may transmit a part of light and reflect a part of the light.

In the display apparatus provided in this embodiment, after imaging light transmitted by the diffusion element 440 is filtered by a first polarizer (an S polarizer 441), the S polarized light (a polarization direction of which is perpendicular to paper) in the imaging light is filtered out, so that the S polarized light is transmitted to the semi-reflective and semi-transparent film 421. The semi-reflective and semi-transparent film 421 reflects a part of the S polarized light to a quarter-wave plate 450, and the quarter-wave plate 450 performs a first phase delay on the incident S polarized light, so that the S polarized light is changed to circularly polarized light or elliptically polarized light. The semi-reflective and semi-transparent film 421 transmits a part of the S polarized light to the P polarizer 422, but the part of the S polarized light cannot be transmitted to the P polarizer 422. Therefore, the part of the S polarized light is absorbed by the P polarizer 422.

The curved mirror 430 reflects the polarized light that is after the first phase delay, that is, reflected polarized light enters the quarter-wave plate 450 again, and the quarter-wave plate 450 performs a second phase delay on the polarized light reflected by the curved mirror 430, so that the circularly polarized light or the elliptically polarized light is changed to P polarized light (a polarization direction of which is parallel with the paper). After the foregoing two phase delays of the quarter-wave plate 450, the incident S polarized light is changed to the emitted P polarized light, the P polarized light may be transmitted by the semi-reflective and semi-transparent film 421 and the P polarizer 422 to a human eye, and the human eye may capture an amplified virtual image.

Compared with FIG. 4, the display apparatus shown in FIG. 6 implements functions of the polarizer 221 that transmits P polarized light and reflects S polarized light by using the semi-reflective and semi-transparent film 421 and the P polarizer 422, and the semi-reflective and semi-transparent film 421 and the P polarizer 422 may be made into a larger area, leading to lower costs.

Figure 7:
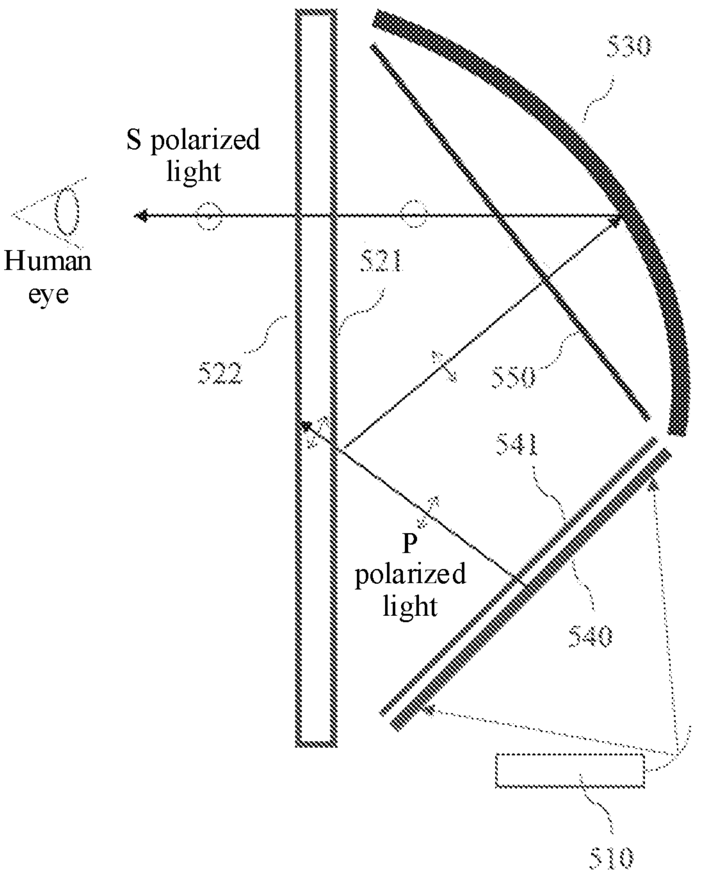
FIG. 7 is a schematic diagram of a structure of a display apparatus according to an embodiment of this disclosure.

FIG. 7 is a schematic diagram of a structure of a display apparatus according to an embodiment of this disclosure.

The display apparatus shown in FIG. 7 is similar to the display apparatus shown in FIG. 5, and a difference lies in that transflective members in an embodiment shown in FIG. 7 are a semi-reflective and semi-transparent film 521 and a second polarizer (an S polarizer 522), and a transflective member in the embodiment in FIG. 5 is the polarizer 321 that transmits S polarized light and reflects P polarized light. Functions of picture generation unit 510, curved mirror 530, and diffusion element 540 are respectively the same as those of the picture generation unit 310, the curved mirror 330, and the diffusion element 340 in the foregoing embodiment, and details are not described herein again.

The S polarizer 522 may transmit S polarized light but cannot transmit P polarized light (where the P polarized light is absorbed), and the S polarizer may also be referred to as a polarizer that transmits S polarized light. The semi-reflective and semi-transparent film 521 may transmit a part of light and reflect a part of the light.

In the display apparatus provided in this embodiment, after imaging light transmitted by the diffusion element 540 is filtered by a first polarizer (a P polarizer 541), the P polarized light (a polarization direction of which is perpendicular to paper) in the imaging light is filtered out, so that the P polarized light is transmitted to the semi-reflective and semi-transparent film 521. The semi-reflective and semi-transparent film 521 reflects a part of the P polarized light to a quarter-wave plate 550, and the quarter-wave plate 550 performs a first phase delay on the incident P polarized light, so that the P polarized light is changed to circularly polarized light or elliptically polarized light. The semi-reflective and semi-transparent film 521 transmits a part of the P polarized light to the S polarizer 522, but the part of the S polarized light cannot be transmitted to the S polarizer 522. Therefore, the part of the P polarized light is absorbed by the S polarizer 522.

The curved mirror 530 reflects the polarized light that is after the first phase delay, that is, reflected polarized light enters the quarter-wave plate 550 again, and the quarter-wave plate 550 performs a second phase delay on the polarized light reflected by the curved mirror 530, so that the circularly polarized light or the elliptically polarized light is changed to S polarized light (a polarization direction of which is parallel with paper). After the foregoing two phase delays of the quarter-wave plate 550, the incident P polarized light is changed to the emitted S polarized light, the S polarized light may be transmitted by the semi-reflective and semi-transparent film 521 and the S polarizer 522 to a human eye, and the human eye may capture an amplified virtual image.

Compared with FIG. 5, the display apparatus shown in FIG. 7 implements functions of the polarizer 321 that transmits S polarized light and reflects P polarized light by using the semi-reflective and semi-transparent film 521 and the S polarizer 522, and the semi-reflective and semi-transparent film 521 and the S polarizer 522 may be made into a larger area, leading to lower costs.

Figure 8:
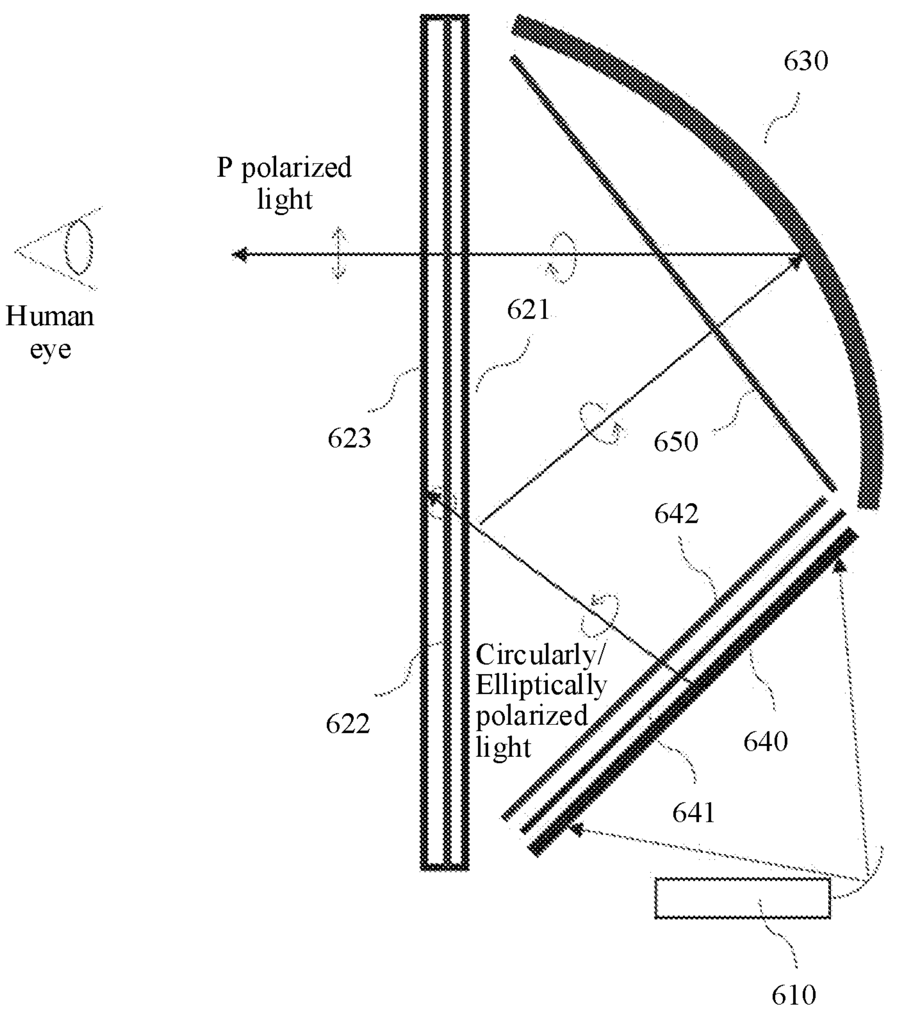
FIG. 8 is a schematic diagram of a structure of a display apparatus according to an embodiment of this disclosure.

FIG. 8 is a schematic diagram of a structure of a display apparatus according to an embodiment of this disclosure.

As shown in FIG. 8, the display apparatus includes a picture generation unit 610, a transflective member, a curved mirror 630, a diffusion element 640, a first polarization conversion device (a quarter-wave plate 650 in this embodiment), a third polarization conversion device (a quarter-wave plate 642 in this embodiment), and a first polarizer (an S polarizer 641 in this embodiment). In this embodiment, the transflective member includes a semi-reflective and semi-transparent film 621, a second polarization conversion device (a quarter-wave plate 622 in this embodiment), and a second polarizer (a P polarizer 623).

Functions of the picture generation unit 610, the curved mirror 630, and the diffusion element 640 are respectively the same as those of the picture generation unit 110, the curved mirror 130, and the diffusion element 140 in the foregoing embodiment, and details are not described herein again.

The S polarizer 641 may transmit S polarized light but cannot transmit P polarized light (where the P polarized light is absorbed). The P polarizer 623 may transmit P polarized light but cannot transmit S polarized light (where the S polarized light is absorbed).

The quarter-wave plate 650 is located on a light path between the semi-reflective and semi-transparent film 621 and the curved mirror 630 and is configured to change a polarization direction of imaging light reflected by the semi-reflective and semi-transparent film 621 and a polarization direction of imaging light reflected by the curved mirror 630.

The quarter-wave plate 642 is located on a light path between the S polarizer 641 and the semi-reflective and semi-transparent film 621 and is configured to change a polarization direction of imaging light transmitted by the S polarizer 641.

The quarter-wave plate 622 is located on a light path between the semi-reflective and semi-transparent film 621 and the P polarizer 623 and is configured to change a polarization direction of imaging light transmitted from the semi-reflective and semi-transparent film 621.

In the display apparatus provided in this embodiment, after imaging light transmitted by the diffusion element 640 is filtered by the S polarizer 641, the S polarized light in the imaging light is filtered out. After the S polarized light is transmitted by the quarter-wave plate 642, a polarization direction of the light is changed. In this embodiment, the S polarized light is changed to emitted left-handed circularly polarized light or elliptically polarized light (left-handed polarized light for short).

The left-handed polarized light is reflected and transmitted by the semi-reflective and semi-transparent film 621, and a polarization direction of a part of a transmitted light ray is changed again through the quarter-wave plate 650. In this embodiment, the left-handed circularly polarized light is changed to emitted S polarized light, and the S polarized light cannot pass through the P polarizer 623, that is, the S polarized light is absorbed by the P polarizer 623. A polarization direction of the other part of the light ray (the left-handed polarized light) that is of the left-handed polarized light and that is reflected by using the semi-reflective and semi-transparent film 621 is changed again through the quarter-wave plate 650. In this embodiment, the left-handed polarized light is changed to emitted linearly polarized light (for example, the S polarized light). After being reflected by the curved mirror 630, the linearly polarized light is transmitted by the quarter-wave plate 650 again. In this case, the linearly polarized light is changed to right-handed polarized light, after being transmitted by the quarter-wave plate 650. An effect of the left-handed polarized light passing through the quarter-wave plate 650 twice is equivalent to that the left-handed polarized light passes through a half-wave plate once.

A polarization direction of a part of the light ray that is of the right-handed polarized light and that is transmitted by the semi-reflective and semi-transparent film 621 is changed again through the quarter-wave plate 622. In this embodiment, the right-handed polarized light changes to the P polarized light after passing through the quarter-wave plate 622, the P polarized light may be transmitted by the P polarizer 623 (a polarization direction of which is parallel with paper), the transmitted P polarized light enters a human eye, and the human eye may capture an amplified virtual image.

Figure 9:
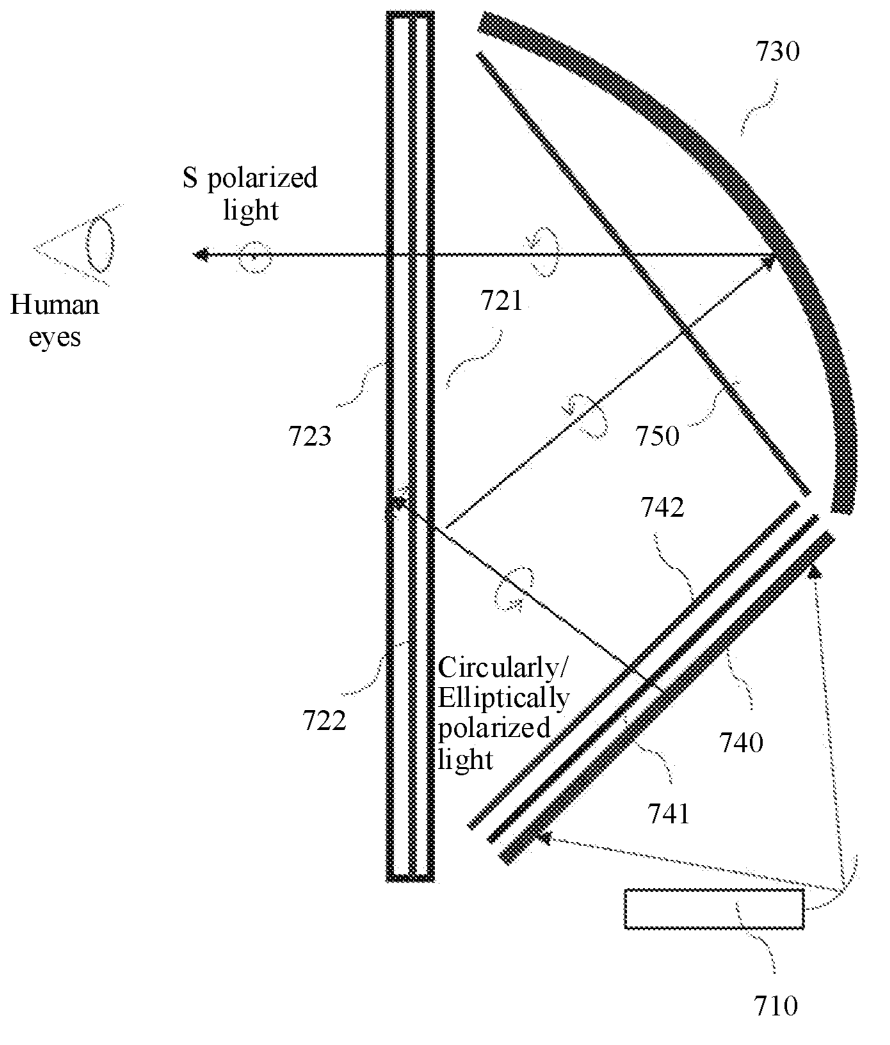
FIG. 9 is a schematic diagram of a structure of a display apparatus according to an embodiment of this disclosure.

FIG. 9 is a schematic diagram of a structure of a display apparatus according to an embodiment of this disclosure.

As shown in FIG. 9, the display apparatus includes a picture generation unit 710, a transflective member, a curved mirror 730, a diffusion element 740, a first polarization conversion device (a quarter-wave plate 750 in this embodiment), a third polarization conversion device (a quarter-wave plate 770 in this embodiment), and a first polarizer (a P polarizer 741 in this embodiment). In this embodiment, the transflective member includes a semi-reflective and semi-transparent film 721, a second polarization conversion device (a quarter-wave plate 722 in this embodiment), and a second polarizer (an S polarizer 723).

Functions of the picture generation unit 710, the curved mirror 730, and the diffusion element 740 are respectively the same as those of the picture generation unit 110, the curved mirror 130, and the diffusion element 140 in the foregoing embodiment, and details are not described herein again.

The S polarizer 723 may transmit S polarized light but cannot transmit P polarized light (where the P polarized light is absorbed). The P polarizer 741 may transmit P polarized light but cannot transmit S polarized light (where the S polarized light is absorbed).

The quarter-wave plate 750 is located on a light path between the semi-reflective and semi-transparent film 721 and the curved mirror 730 and is configured to change a polarization direction of imaging light reflected by the semi-reflective and semi-transparent film 721 and a polarization direction of the imaging light reflected by the curved mirror 730.

The quarter-wave plate 742 is located on a light path between the P polarizer 741 and the semi-reflective and semi-transparent film 721 and is configured to change a polarization direction of the imaging light transmitted by the S polarizer 741.

The quarter-wave plate 722 is located on a light path between the semi-reflective and semi-transparent film 721 and the S polarizer 723 and is configured to change a polarization direction of the imaging light transmitted from the semi-reflective and semi-transparent film 721.

In the display apparatus provided in this embodiment, after the imaging light transmitted by the diffusion element 740 is filtered by the P polarizer 741, the P polarized light in the imaging light is filtered out. After the P polarized light is transmitted by the quarter-wave plate 742, a polarization direction of the light is changed. In this embodiment, the S polarized light is changed to emitted right-handed circularly polarized light or elliptically polarized light (right-handed polarized light for short).

The left-handed polarized light is reflected and transmitted by the semi-reflective and semi-transparent film 721, and a polarization direction of a part of a transmitted light ray is changed again through the quarter-wave plate 750. In this embodiment, the left-handed circularly polarized light is changed to emitted S polarized light, and the S polarized light cannot pass through the P polarizer 723, that is, the S polarized light is absorbed by the P polarizer 723. A polarization direction of the other part of the light ray (the left-handed polarized light) that is of the left-handed polarized light and that is reflected by the semi-reflective and semi-transparent film 721 is changed again through the quarter-wave plate 750. In this embodiment, the left-handed polarized light is changed to emitted linearly polarized light (for example, the P polarized light). After being reflected by the curved mirror 730, the linearly polarized light is transmitted by the quarter-wave plate 750 again. In this case, the linearly polarized light is changed to right-handed polarized light, after being transmitted by the quarter-wave plate 750. An effect of the left-handed polarized light passing through the quarter-wave plate 750 twice is equivalent to that the left-handed polarized light passes through a half-wave plate once.

A polarization direction of a part of the light ray that is of the right-handed polarized light and that is transmitted by the semi-reflective and semi-transparent film 721 is changed again through the quarter-wave plate 722. In this embodiment, the right-handed polarized light changes to the P polarized light after passing through the quarter-wave plate 722, the P polarized light may be transmitted by the P polarizer 723 (a polarization direction of which is parallel with paper), the transmitted P polarized light enters a human eye, and the human eye may capture an amplified virtual image.

Figure 10:
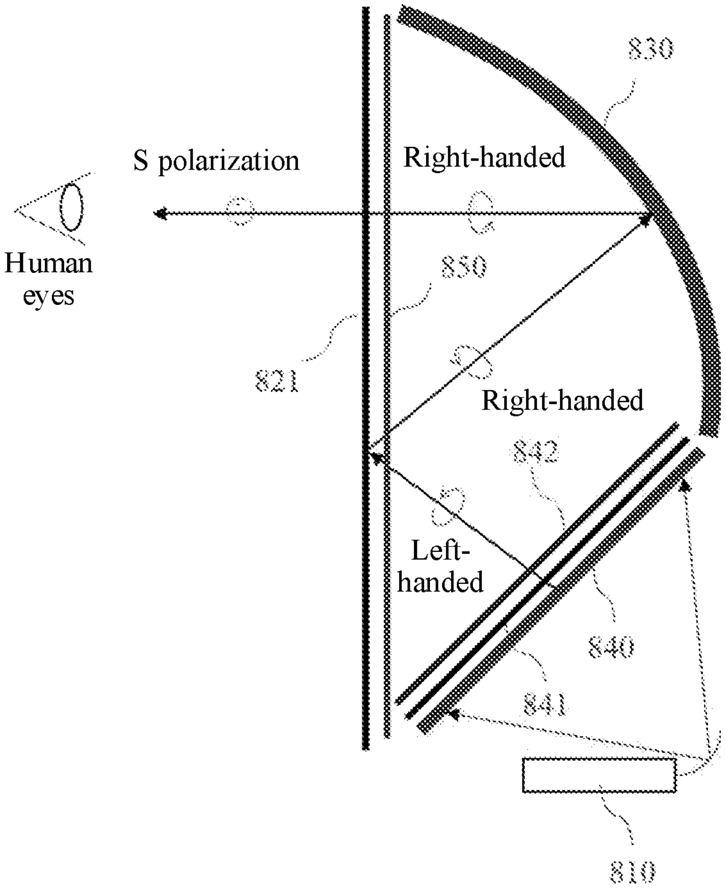
FIG. 10 is a schematic diagram of a structure of a display apparatus according to an embodiment of this disclosure.

FIG. 10 is a schematic diagram of a structure of a display apparatus according to an embodiment of this disclosure.

As shown in FIG. 10, the display apparatus includes a picture generation unit 810, a transflective member, a curved mirror 830, a diffusion element 840, a first polarization conversion device (a quarter-wave plate 850 in this embodiment), a third polarization conversion device (a quarter-wave plate 842 in this embodiment), and a first polarizer (an S polarizer 841 in this embodiment). In this embodiment, the transflective member includes a polarizing film 821 that transmits S polarized light and reflects P polarized light.

Functions of the picture generation unit 810, the curved mirror 830, and the diffusion element 840 are respectively the same as those of the picture generation unit 610, the curved mirror 630, and the diffusion element 640 in the foregoing embodiment, and details are not described herein again.

The S polarizer 841 may transmit S polarized light but cannot transmit P polarized light (where the P polarized light is absorbed).

The polarizing film 821 that transmits S polarized light and reflects P polarized light may transmit S polarized light and reflect P polarized light.

The quarter-wave plate 850 is located on a light path between the polarizing film 821 that transmits S polarized light and reflects P polarized light and the curved mirror 830 and is configured to change a polarization direction of imaging light reflected by the polarizing film 821 that transmits S polarized light and reflects P polarized light and a polarization direction of the imaging light reflected by the curved mirror 830. In addition, the quarter-wave plate 850 is further located on a light path between the quarter-wave plate 842 and the polarizing film 821 that transmits S polarized light and reflects P polarized light and is configured to change a polarization direction of the imaging light incident from the quarter-wave plate 842.

The quarter-wave plate 842 is located on a light path between the S polarizer 841 and the quarter-wave plate 850 and is configured to change a polarization direction of the imaging light transmitted by the S polarizer 841.

In the display apparatus provided in this embodiment, after the imaging light transmitted by the diffusion element 840 is filtered by the S polarizer 841, the S polarized light in the imaging light is filtered out. After the S polarized light is transmitted by the quarter-wave plate 842, a polarization direction of the light is changed. In this embodiment, the S polarized light is changed to emitted left-handed circularly polarized light or elliptically polarized light (left-handed polarized light for short).

After the left-handed polarized light passes through the quarter-wave plate 850, a polarization direction is changed. In this embodiment, the left-handed polarized light is changed to P polarized light for emission. After being reflected by the polarizing film 821 that transmits S polarized light and reflects P polarized light, the P polarized light passes through the quarter-wave plate 850 again to transmit right-handed polarized light.

After being reflected by the curved mirror 830, the right-handed polarized light is transmitted by the quarter-wave plate 850 again. In this case, the right-handed polarized light is changed to the S polarized light (a polarization direction of which is perpendicular to paper) after being transmitted by the quarter-wave plate 850. An effect of the polarized light passing through the quarter-wave plate 850 twice may be equivalent to that the polarized light passes through a half-wave plate once. The transmitted S polarized light enters a human eye, and the human eye may capture a magnified virtual image.

Compared with the display apparatus shown in FIG. 4 to FIG. 9, in the display apparatus provided in this embodiment, the quarter-wave plate 850 does not directly cover the curved mirror 830 but is disposed in parallel with the polarizing film 821 that transmits S polarized light and reflects P polarized light, leading to an easier installation and lower overall costs.

In addition, the polarizing film 821 that transmits S polarized light and reflects P polarized light may be implemented by using the semi-reflective and semi-transparent film 521 and the S polarizer 522 in the embodiment shown in FIG. 5. For a specific implementation process, refer to the foregoing embodiment, and details are not described herein again.

Figure 11:
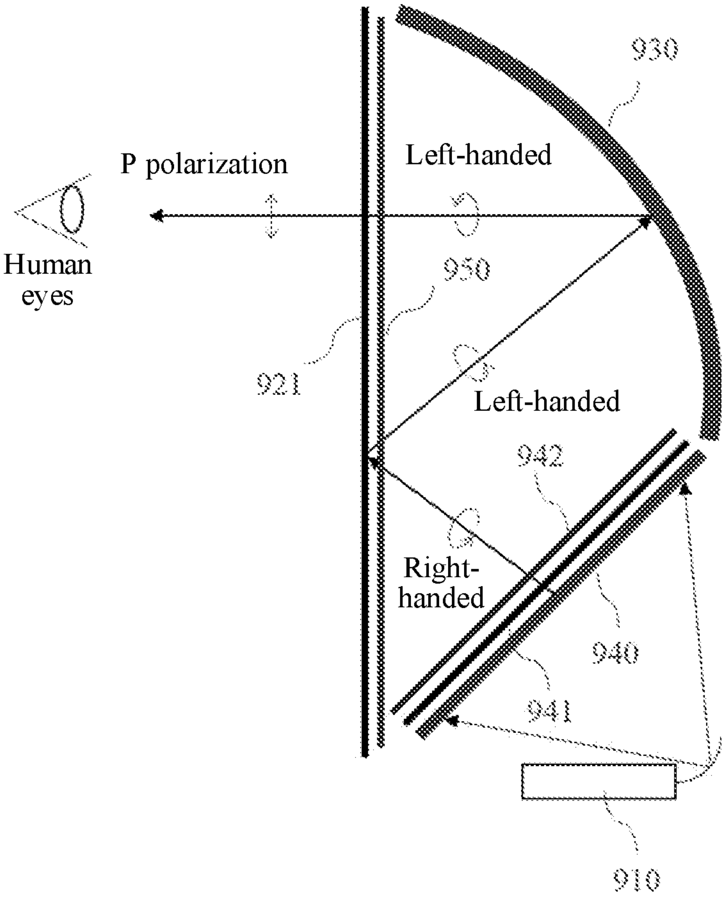
FIG. 11 is a schematic diagram of a structure of a display apparatus according to an embodiment of this disclosure.

FIG. 11 is a schematic diagram of a structure of a display apparatus according to an embodiment of this disclosure.

As shown in FIG. 11, the display apparatus includes a picture generation unit 910, a transflective member, a curved mirror 930, a diffusion element 940, a first polarization conversion device (a quarter-wave plate 950 in this embodiment), a third polarization conversion device (a quarter-wave plate 942 in this embodiment), and a first polarizer (a P polarizer 941 in this embodiment). In this embodiment, the transflective member includes a polarizing film 921 that transmits P polarized light and reflects S polarized light.

Functions of the picture generation unit 910, the curved mirror 930, and the diffusion element 940 are respectively the same as those of the picture generation unit 810, the curved mirror 830, and the diffusion element 840 in the foregoing embodiment, and details are not described herein again.

The P polarizer 941 may transmit P polarized light but cannot transmit S polarized light (where the S polarized light is absorbed).

The polarizing film 921 that transmits P polarized light and reflects S polarized light may transmit P polarized light and reflect S polarized light. The polarizing film 921 that transmits P polarized light and reflects S polarized light may be disposed in parallel with the quarter-wave plate 950.

The quarter-wave plate 950 is located on a light path between the polarizing film 921 that transmits P polarized light and reflects S polarized light and the curved mirror 930 and is configured to change a polarization direction of imaging light reflected by the polarizing film 921 that transmits P polarized light and reflects S polarized light and a polarization direction of the imaging light reflected by the curved mirror 930. In addition, the quarter-wave plate 950 is further located on a light path between the quarter-wave plate 942 and the polarizing film 921 that transmits P polarized light and reflects S polarized light and is configured to change a polarization direction of the imaging light incident from the quarter-wave plate 942.

The quarter-wave plate 942 is located on a light path between the P polarizer 941 and the quarter-wave plate 950 and is configured to change a polarization direction of the imaging light transmitted by the P polarizer 941.

In the display apparatus provided in this embodiment, after the imaging light transmitted by the diffusion element 940 is filtered by the P polarizer 941, the P polarized light in the imaging light is filtered out. After the P polarized light is transmitted by the quarter-wave plate 942, a polarization direction of the light is changed. In this embodiment, the P polarized light is changed to emitted right-handed circularly polarized light or elliptically polarized light (right-handed polarized light for short).

After the right-handed polarized light passes through the quarter-wave plate 950, a polarization direction is changed. In this embodiment, the right-handed polarized light is changed to emitted S polarized light. After being reflected by the polarizing film 921 that transmits P polarized light and reflects S polarized light, the S polarized light passes through the quarter-wave plate 950 again to transmit left-handed polarized light.

After being reflected by the curved mirror 930, the left-handed polarized light is transmitted by the quarter-wave plate 950 again. In this case, the left-handed polarized light is changed to the P polarized light (a polarization direction of which is parallel with paper) after being transmitted by the quarter-wave plate 950. An effect of the polarized light passing through the quarter-wave plate 950 twice may be equivalent to that the polarized light passes through a half-wave plate once. The transmitted P polarized light enters a human eye, and the human eye may capture a magnified virtual image.

In addition, the polarizing film 921 that transmits P polarized light and reflects S polarized light may be implemented by using the semi-reflective and semi-transparent film 421 and the P polarizer 422 in the display apparatus shown in FIG. 6. For a specific implementation process, refer to the foregoing embodiment, and details are not described herein again.

In the foregoing embodiments of this disclosure, the polarizer may be referred to as a polarizing plate, a polarizing device, a polarizing film, or a polarization device. For example, the P polarizer may be referred to as a P polarizing film, and the polarizer that transmits S polarized light and reflects P polarized light may be referred to as a polarization device that transmits S polarized light and reflects P polarized light.

Figure 12:
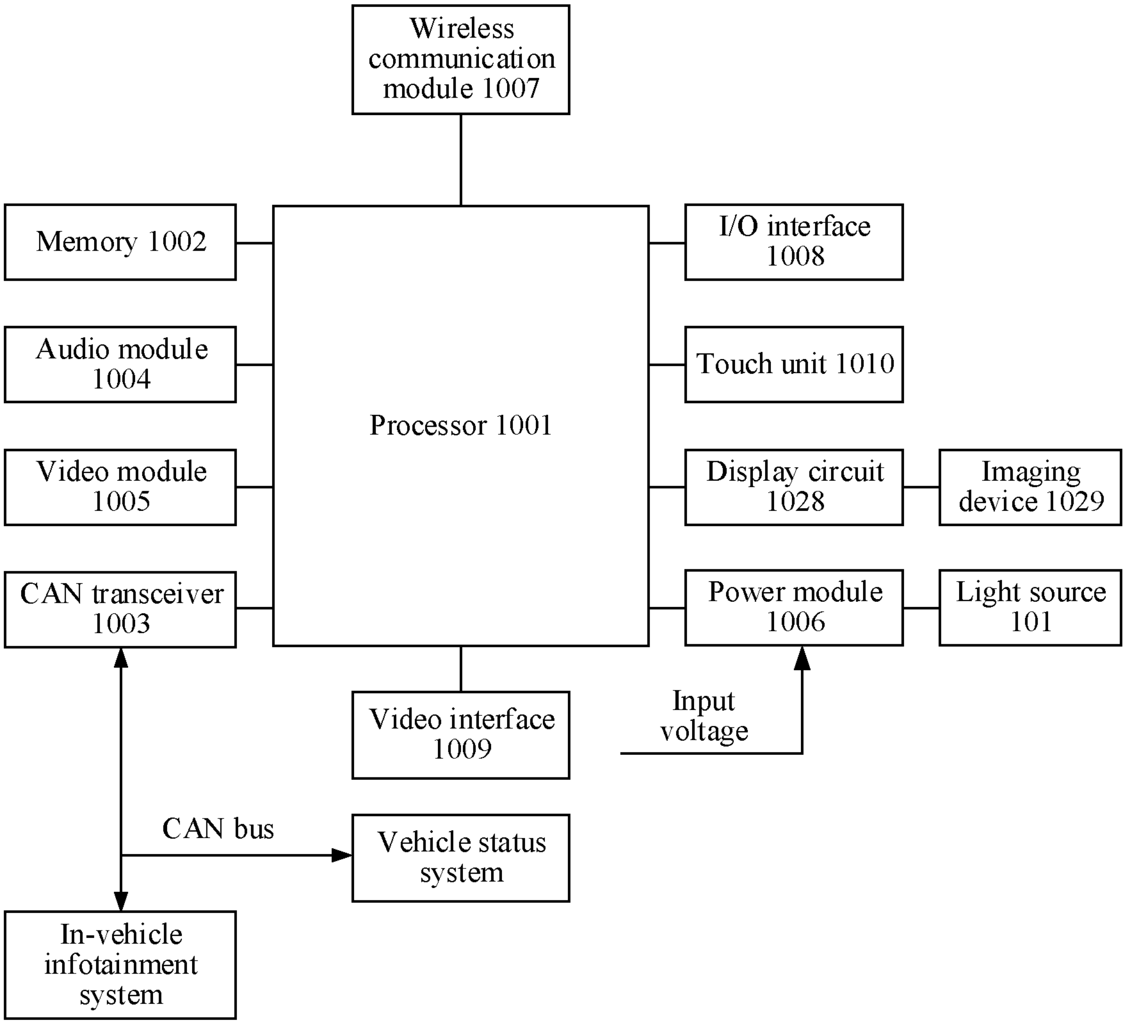
FIG. 12 is a schematic diagram of a circuit of a display apparatus according to an embodiment of this disclosure.

FIG. 12 is a schematic diagram of a circuit of a display apparatus according to an embodiment of this disclosure.

As shown in FIG. 12, the circuit in the display apparatus mainly includes a processor 1001, a memory 1002, a controller area network (CAN) transceiver 1003, an audio module 1004, a video module 1005, a power module 1006, a wireless communication module 1007, an I/O interface 1008, a video interface 1009, a touch unit 1010, a display circuit 1028, an imaging device 1029, and the like. The processor 1001 and peripheral elements, such as the memory 1002, the CAN transceiver 1003, the audio module 1004, the video module 1005, the power module 1006, the wireless communication module 1007, the I/O interface 1008, the video interface 1009, the touch unit 1010, and the display circuit 1028, may be connected through a bus. The processor 1001 may be referred to as a front-end processor.

In addition, the schematic diagram of the circuit shown in this embodiment of this disclosure does not constitute a specific limitation on the display apparatus. In some other embodiments of this disclosure, the display apparatus may include more or fewer components than those shown in the figure, or some components may be combined, or some components may be split, or different component arrangements may be used. The components shown in the figure may be implemented by hardware, software, or a combination of software and hardware.

The processor 1001 includes one or more processing units. For example, the processor 1001 may include an disclosure processor (AP), a modem processor, a graphics processing unit (GPU), an image signal processor (ISP), a controller, a video codec, a digital signal processor (DSP), a baseband processor, and/or a neural-network processor (NPU). Different processing units may be independent components or may be integrated into one or more processors.

A memory configured to store instructions and data may be further disposed in the processor 1001. In some embodiments, the memory in the processor 1001 is a cache. The memory may store instructions or data that is recently used or to be cyclically used by the processor 1001. If the processor 1001 needs to use the instructions or the data again, the processor may directly invoke the instructions or the data from the memory. This avoids repeated accessing and reduces a wait time of the processor 1001, thereby improving system efficiency.

In some embodiments, the display apparatus may further include a plurality of input/output (I/O) interfaces 1008 connected to the processor 1001. The interface 1008 may include but is not limited to an inter-integrated circuit (I2C) interface, an integrated circuit sound (InterI2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like. The I/O interface 1008 may be connected to a device such as a mouse, a touchpad, a keyboard, a camera, a speaker/horn, or a microphone, or may be connected to a physical button (for example, a volume button, a brightness adjustment button, or a power button) on the display apparatus.

The memory 1002 may include an internal memory and may further include an external memory (for example, a micro SD card). The memory 1002 may be configured to store computer executable program code, and the executable program code includes instructions. The memory 1002 may include a program storage area and a data storage area. The program storage area may store an operating system, an application program needed by at least one function (for example, a calling function and a time setting function), and the like. The data storage area may store data (for example, a personal address book and world time) and the like created during use of the display apparatus, and the like. In addition, the memory 1002 may include a high-speed random access memory, or may include a non-volatile memory, for example, at least one magnetic disk storage device, a flash memory device, or a universal flash storage (Universal Flash Storage, UFS). The processor 1001 runs the instructions stored in the memory 1002 and/or the instructions stored in the memory disposed in the processor 1001, to perform various functional applications and data processing of the display apparatus.

Further, the display apparatus further includes the CAN transceiver 1003, and the CAN transceiver 1003 may be connected to a CAN bus of a vehicle. Through the CAN bus, the display apparatus may communicate with an in-vehicle infotainment system (music, radio, and a video module), a vehicle status system, and the like. For example, a subscriber may enable a vehicle-mounted music playing function by operating the display apparatus. The vehicle status system may send vehicle status information (for example, a vehicle door and a safety belt) to the display apparatus for display.

The display apparatus may implement an audio function by using the audio module 1004, the application processor, and the like, for example, music playing and calling.

The audio module 1004 is configured to convert digital audio information into an outputted analog audio signal and is also configured to convert inputted analog audio into a digital audio signal. The audio module 1004 may be further configured to: encode and decode an audio signal, for example, perform voice production or recording. In some embodiments, the audio module 1004 may be disposed in the processor 1001, or some functional modules of the audio module 1004 may be disposed in the processor 1001.

The video interface 1009 may receive an inputted audio and video, and the video interface may be specifically a high definition multimedia interface (HDMI), a digital visual interface (DVI), a video graphics array (VGA), a display port (DP), a low voltage differential signal (LVDS) interface, and the like. The video interface 1009 may further output a video. For example, the display apparatus receives, by using the video interface, video data sent by a navigation system.

The video module 1005 may decode a video inputted by the video interface 1009, for example, perform H.264 decoding. The video module may further encode a video collected by the display apparatus, for example, perform H.264 encoding on a video collected by an external camera. In addition, the processor 1001 may also decode the video inputted by the video interface 1009, and then output a decoded image signal to the display circuit.

The display circuit 1028 and the imaging device 1029 are configured to display corresponding images. In this embodiment, the video interface 1009 receives inputted video data (or referred to as a video source), the video module 1005 performs decoding and/or digitization processing and then outputs an image signal to the display circuit 1028, and the display circuit 1028 drives, based on the inputted image signal, the imaging device 1029 to perform imaging on a light beam emitted by a light source 101, to generate a visual image. For example, the imaging device 1029 generates a source image and emits imaging light. The display circuit 1028 and the imaging device 1029 are electronic elements in an imaging module 102, and the display circuit 1028 may be referred to as a drive circuit.

The power module 1006 is configured to supply power to the processor 1001 and the light source 101 based on inputted power (for example, a direct current), and the power module 1006 may include a rechargeable battery, where the rechargeable battery may supply power to the processor 1001 and the light source 101. A light emitted by the light source 101 may be transmitted to the imaging device 1029 for imaging, to form an image optical signal (the imaging light).

In addition, the power module 1006 may be connected to a power supply module (for example, a power battery) of the vehicle, where the power supply module of the vehicle supplies power to the power module 1006 of the display apparatus.

The wireless communication module 1007 enables the display apparatus to perform wireless communication with the outside, and the wireless communication module may provide a solution to wireless communication such as a wireless local area network (WLAN) (for example, a wireless fidelity (Wi-Fi) network), Bluetooth (BT), a global navigation satellite system (GNSS), frequency modulation (FM), near field communication (NFC), and an infrared (IR) technology. The wireless communication module 1007 may be one or more devices integrating at least one communications processor module. The wireless communication module 1007 receives an electromagnetic wave through an antenna, performs frequency modulation and filtering processing on the electromagnetic wave signal, and sends the processed signal to the processor 1001. The wireless communication module 1007 may further receive a to-be-sent signal from the processor 1001 and perform frequency modulation and amplification on the signal. The amplified signal is converted into an electromagnetic wave and radiated out through the antenna.

In addition, in addition to being inputted through the video interface 1009, the video data decoded by the video module 1005 may also be received in a wireless manner by using the wireless communication module 1007 or be read from the memory 1002. For example, the display apparatus may receive the video data from a terminal device or the in-vehicle infotainment system by using a wireless local area network in the vehicle, and the display apparatus may further read audio and video data stored in the memory 1002.

The touch unit 1010 may generate a control signal (for example, a brightness/contrast adjustment signal) based on a touch operation performed by the subscriber on a touch interface, and then send the control signal to the display circuit 1028 by using the processor 201. The display circuit 1028 adjusts imaging of the imaging device 1029 based on the control signal, to change the displayed source image. The touch interface may include a control key (for example, a volume, brightness, contrast adjustment key).

The curved mirror in disclosed embodiments may be a multi-focus free-form curved mirror. A multi-focus free-form reflector is designed to realize viewing by a plurality of people.

The transportation means in embodiments of this disclosure may be a known transportation means such as a vehicle, an airplane, a ship, or a rocket, or may be a transportation means that is newly emerging in the future. The vehicle may be an electric vehicle, a fuel vehicle, or a hybrid vehicle, for example, a battery electric vehicle, a range extended electric vehicle, a plug-in hybrid electric vehicle, a fuel battery vehicle, or a new energy vehicle. This is not specifically limited in this disclosure. In addition, the electronic device in embodiments of this disclosure includes a device on which a display apparatus is installed, and the device may include the foregoing transportation means, or may be a medical device, an office entertainment device, or an industrial control device. This is not limited in this embodiment.

The terms "first, second, third, fourth", and the like in this disclosure are intended to distinguish between similar objects rather than describe a specific order or sequence. It should be understood that data used in this way is exchangeable in a proper circumstance, so that embodiments described herein can be implemented in an order not described in this disclosure. To more clearly reflect a relationship between components in different embodiments, a same accompanying drawing number is used in this disclosure for representing components with a same or similar function in different embodiments.

It should be further noted that, unless otherwise specified, specific descriptions for some technical features in one embodiment may further be used for explaining corresponding technical features mentioned in other embodiments.

The same or similar parts in embodiments of this disclosure may refer to each other. The foregoing descriptions are merely specific implementations of embodiments and are not intended to limit the scope of this disclosure. Any variation or replacement readily determined by a person skilled in the art within the technical scope of disclosed embodiments shall fall within the protection scope of the accompanying claims.

What is claimed is:

1. A display apparatus, comprising:

a picture generation unit configured to generate imaging light comprising image information and to project the imaging light along a light path;

a transflective member positioned along the light path and configured to reflect imaging light received from the picture generation unit;

a curved mirror positioned along the light path and configured to reflect imaging light to the transflective member, wherein:

the transflective member is further configured to transmit at least a portion of imaging light reflected by the curved mirror;

a first polarizer located on a light-emitting side of a diffusion element; and the diffusion element positioned along the light path between the picture generation unit and the transflective member that is configured to diffuse the imaging light projected by the picture generation unit, wherein the transflective member comprises:

a semi-reflective and semi-transparent film; and a second polarizer, wherein:

the semi-reflective and semi-transparent film is configured to reflect a first part of the imaging light to the curved mirror and to transmit a second part of the imaging light to the second polarizer, wherein the second polarizer is configured to absorb the second part of the imaging light and to transmit the imaging light reflected by the curved mirror, the imaging light reflected by the semi-reflective and semi-transparent film is P polarized light, the imaging light absorbed by the second polarizer is P polarized light, and the imaging light transmitted by the second polarizer is S polarized light; or the imaging light reflected by the semi-reflective and semi-transparent film is S polarized light, the imaging light absorbed by the second polarizer is S polarized light, and the imaging light transmitted by the second polarizer is P polarized light.

2. The display apparatus according to claim 1, wherein:

a polarization direction of the imaging light reflected by the transflective member is different from a polarization direction of the imaging light transmitted by the transflective member.

3. The display apparatus according to claim 1, wherein:

the transflective member comprises a polarized transflective member, and a polarization direction of imaging light reflected by the polarized transflective member is perpendicular to a polarization direction of imaging light transmitted by the polarized transflective member.

4. The display apparatus according to claim 1, wherein:

the transflective member comprises a polarized transflective member, wherein imaging light reflected by the polarized transflective member is circularly polarized light or elliptically polarized light, and imaging light transmitted by the polarized transflective member is linearly polarized light.

5. The display apparatus according to claim 1, wherein:

the imaging light reflected by the transflective member is the P polarized light, and the imaging light transmitted by the transflective member is the S polarized light; or the imaging light reflected by the transflective member is the S polarized light, and the imaging light transmitted by the transflective member is the P polarized light.

6. The display apparatus according to claim 1, further comprising:

a first polarization conversion device positioned along the light path between the transflective member and the curved mirror and configured to change a polarization direction of the imaging light reflected by at least one of the transflective member or a polarization direction of the imaging light reflected by the curved mirror.

7. The display apparatus according to claim 6, wherein a first polarization conversion device is a quarter-wave plate.

8. The display apparatus according to claim 7, wherein the quarter-wave plate is configured to perform a phase delay as a second change of the polarization direction of the imaging light reflected by at least one of the transflective member or the polarization direction of the imaging light reflected by the curved mirror.

9. The display apparatus according to claim 1, wherein the semi-reflective and semi-transparent film is attached to the second polarizer.

10. The display apparatus according to claim 1, wherein the imaging light reflected by the semi-reflective and semi-transparent film is circularly polarized light or elliptically polarized light, and the imaging light transmitted by the semi-reflective and semi-transparent film is circularly polarized light or elliptically polarized light.

11. The display apparatus according to claim 10, wherein:

the transflective member further comprises a second polarization conversion device positioned between the semi-reflective and semi-transparent film and the second polarizer; and the second polarization conversion device is configured to change a polarization direction of the circularly polarized light or the elliptically polarized light transmitted by at least one of the semi-reflective and semi-transparent film or a polarization direction of circularly polarized light or elliptically polarized light reflected by the curved mirror.

12. A transportation means, comprising:

a display apparatus, comprising:

a picture generation unit configured to generate imaging light comprising image information and to project the imaging light along a light path;

a transflective member positioned along the light path and configured to reflect imaging light received from the picture generation unit;

a curved mirror positioned along the light path and configured to reflect imaging light to the transflective member, wherein:

the transflective member is further configured to transmit at least a portion of imaging light reflected by the curved mirror;

a first polarizer located on a light-emitting side of a diffusion element; and the diffusion element positioned along the light path between the picture generation unit and the transflective member that is configured to diffuse the imaging light projected by the picture generation unit, wherein the transflective member comprises:

a semi-reflective and semi-transparent film; and a second polarizer, wherein:

the semi-reflective and semi-transparent film is configured to reflect a first part of the imaging light to the curved mirror and to transmit a second part of the imaging light to the second polarizer, wherein the second polarizer is configured to absorb the second part of the imaging light and to transmit the imaging light reflected by the curved mirror, the imaging light reflected by the semi-reflective and semi-transparent film is P polarized light, the imaging light absorbed by the second polarizer is P polarized light, and the imaging light transmitted by the second polarizer is S polarized light; or the imaging light reflected by the semi-reflective and semi-transparent film is S polarized light, the imaging light absorbed by the second polarizer is S polarized light, and the imaging light transmitted by the second polarizer is P polarized light.

13. The transportation means according to claim 12, wherein:

a polarization direction of the imaging light reflected by the transflective member is different from a polarization direction of the imaging light transmitted by the transflective member.

14. The transportation means according to claim 12 wherein:

the transflective member comprises a polarized transflective member, and a polarization direction of imaging light reflected by the polarized transflective member is perpendicular to a polarization direction of imaging light transmitted by the polarized transflective member.

15. The transportation means according to claim 12 wherein:

the transflective member comprises a polarized transflective member, wherein imaging light reflected by the polarized transflective member is circularly polarized light or elliptically polarized light, and imaging light transmitted by the polarized transflective member is linearly polarized light.

16. The transportation means according to claim 12, wherein:

the imaging light reflected by the transflective member is the P polarized light, and the imaging light transmitted by the transflective member is the S polarized light; or the imaging light reflected by the transflective member is the S polarized light, and the imaging light transmitted by the transflective member is the P polarized light.

17. The transportation means according to claim 12, further comprising:

a first polarization conversion device positioned along the light path between the transflective member and the curved mirror and configured to change a polarization direction of the imaging light reflected by at least one of the transflective member or a polarization direction of the imaging light reflected by the curved mirror.

18. A display apparatus, comprising:

a picture generation unit configured to generate imaging light comprising image information and to project the imaging light along a light path;

a transflective member positioned along the light path and configured to reflect imaging light received from the picture generation unit; and a curved mirror positioned along the light path and configured to reflect imaging light to the transflective member, wherein the transflective member is further configured to transmit at least a portion of imaging light reflected by the curved mirror;

wherein the transflective member comprises:

a semi-reflective and semi-transparent film; and a polarizer; wherein:

wherein the semi-reflective and semi-transparent film is configured to reflect a first part of the imaging light to the curved mirror and to transmit a second part of the imaging light to the polarizer; and wherein the polarizer is configured to absorb the second part of the incident imaging light and to transmit the imaging light reflected by the curved mirror, wherein the imaging light reflected by the semi-reflective and semi-transparent film is circularly polarized light or elliptically polarized light, and the imaging light transmitted by the semi-reflective and semi-transparent film is circularly polarized light or elliptically polarized light, wherein the transflective member further comprises a polarization conversion device positioned between the semi-reflective and semi-transparent film and the polarizer, and wherein the polarization conversion device is configured to change a polarization direction of the circularly polarized light or the elliptically polarized light transmitted by at least one of the semi-reflective and semi-transparent film or a polarization direction of circularly polarized light or elliptically polarized light reflected by the curved mirror.

* * * * *